(12) United States Patent
Steger et al.

(10) Patent No.: US 10,408,327 B2
(45) Date of Patent: Sep. 10, 2019

(54) MOUNTING ARRANGEMENT FOR MOUNTING A GEAR BOX OF A ROTORCRAFT TO A FUSELAGE OF A ROTORCRAFT

(71) Applicant: AIRBUS HELICOPTERS DEUTSCHLAND GMBH, Donauworth (DE)

(72) Inventors: Justus Steger, Neustadt A.D. Aicsch (DE); Christian Wehle, Augsburg (DE); Henry Gunn, Augsburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 486 days.

(21) Appl. No.: 15/278,427

(22) Filed: Sep. 28, 2016

(65) Prior Publication Data
US 2017/0089443 A1    Mar. 30, 2017

(30) Foreign Application Priority Data

Sep. 29, 2015    (EP) .................................... 15400042

(51) Int. Cl.
| | |
|---|---|
| B64C 27/00 | (2006.01) |
| F16H 57/025 | (2012.01) |
| B64C 27/14 | (2006.01) |
| B64D 35/08 | (2006.01) |
| F16H 57/028 | (2012.01) |
| B64C 27/12 | (2006.01) |

(52) U.S. Cl.
CPC ........... *F16H 57/025* (2013.01); *B64C 27/12* (2013.01); *B64C 27/14* (2013.01); *B64D 35/08* (2013.01); *F16H 57/028* (2013.01); *B64C 2027/002* (2013.01)

(58) Field of Classification Search
CPC ....................... B64C 27/001; B64C 2027/002
See application file for complete search history.

(56) References Cited

U.S. PATENT DOCUMENTS

| | | | |
|---|---|---|---|
| 3,920,202 A | | 11/1975 | Mouille |
| 4,362,281 A | * | 12/1982 | Cresap .................. B64C 27/001 188/379 |

(Continued)

FOREIGN PATENT DOCUMENTS

| | | |
|---|---|---|
| EP | 0508938 | 10/1992 |

OTHER PUBLICATIONS

European Search Report for European Application No. EP 1540042, Completed by the European Patent Office dated Mar. 7, 2016, 5 Pages.

*Primary Examiner* — Philip J Bonzell
*Assistant Examiner* — Tye William Abell
(74) *Attorney, Agent, or Firm* — Brooks Kushman P.C.

(57) ABSTRACT

A mounting arrangement for mounting at least a gear box of a rotorcraft to a fuselage of a rotorcraft, the mounting arrangement comprising a gear box of a rotorcraft and at least two support plates that are rigidly attached to at least approximately opposing sides of the gear box, each one of the at least two support plates comprising at least two attachment means that are adapted to allow attachment of the at least two support plates to a fuselage of a rotorcraft by means of associated struts in order to enable transfer of induced loads occurring in operation, which are directed into a predetermined load direction, via the associated struts.

20 Claims, 5 Drawing Sheets

(56) References Cited

U.S. PATENT DOCUMENTS

| | | | | |
|---|---|---|---|---|
| 4,720,060 | A | 1/1988 | Yana | |
| 6,293,532 | B2 | 9/2001 | McGuire | |
| 6,431,530 | B1 * | 8/2002 | Stamps | F16F 1/38 267/136 |
| 2007/0034736 | A1 | 2/2007 | Ferrer | |
| 2013/0105621 | A1 * | 5/2013 | Smith | F16F 13/24 244/17.27 |
| 2013/0270415 | A1 * | 10/2013 | Lee | F16F 7/00 248/638 |
| 2015/0308534 | A1 * | 10/2015 | Smith | F16F 7/1034 188/378 |
| 2017/0137120 | A1 * | 5/2017 | Bottasso | B64C 27/001 |

* cited by examiner

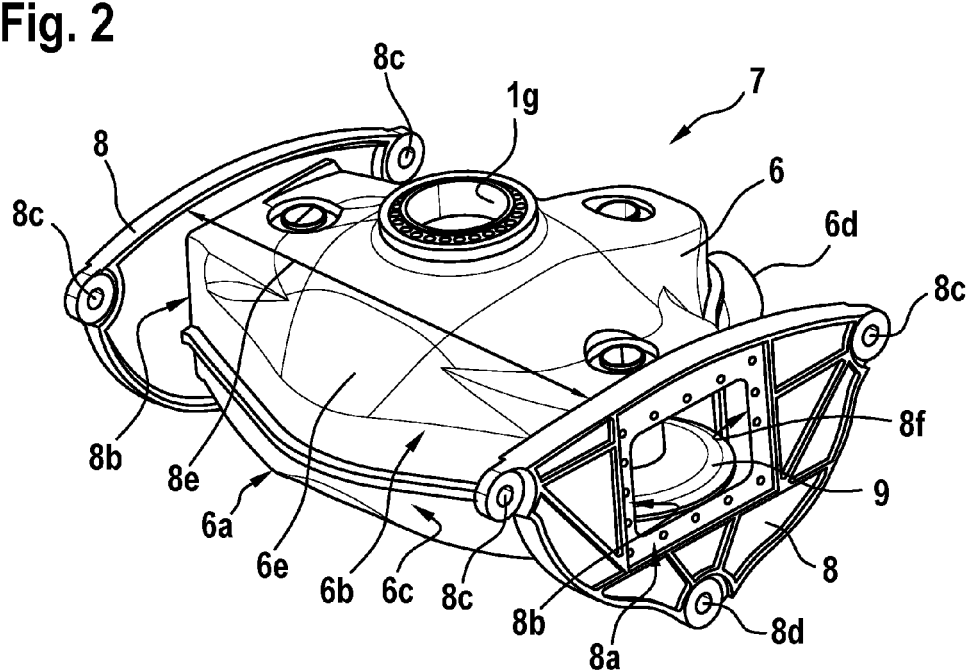
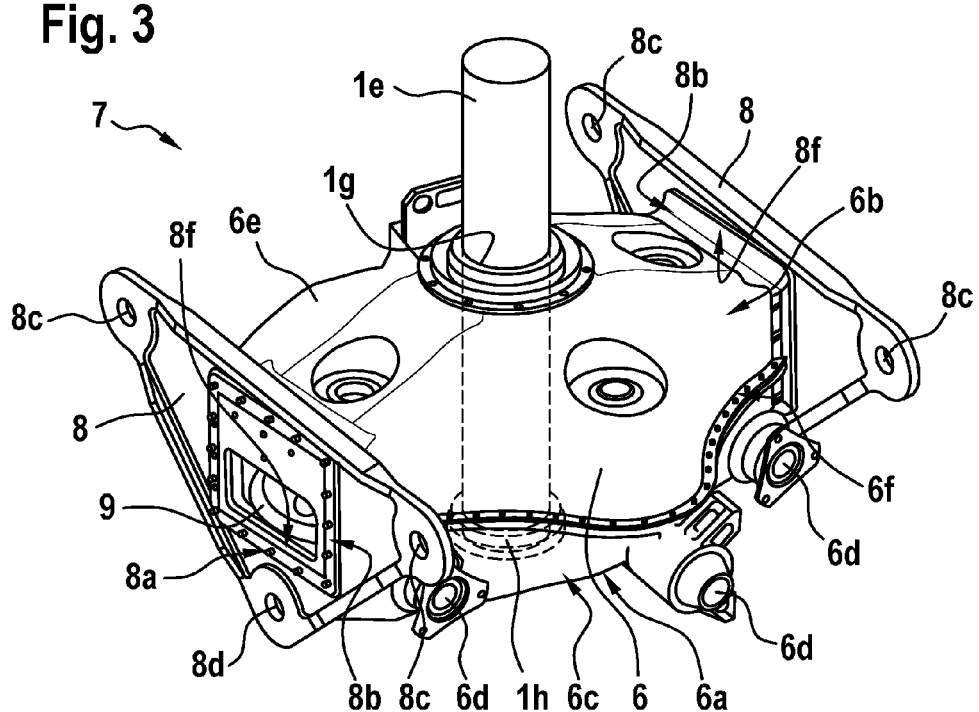

MOUNTING ARRANGEMENT FOR MOUNTING A GEAR BOX OF A ROTORCRAFT TO A FUSELAGE OF A ROTORCRAFT

CROSS REFERENCE TO RELATED APPLICATION

This application claims priority to European patent application No. EP 15400042.6 filed on Sep. 29, 2015, the disclosure of which is incorporated in its entirety by reference herein.

BACKGROUND OF THE INVENTION (1) Field of the Invention

The invention is related to a mounting arrangement for mounting at least a gear box of a rotorcraft to a fuselage of a rotorcraft, said mounting arrangement comprising the features of claim 1. The invention is further related to a rotorcraft comprising such a mounting arrangement, said rotorcraft comprising the features of claim 16.

(2) Description of Related Art

Lift and other forces that are required in order to allow a controlled flight of a rotorcraft are usually at least essentially generated through one or more rotors of the rotorcraft in a more or less horizontal plane. Conventional design methodology utilizes a rotating or non-rotating mast, to which a given rotor that is powered by an associated gear box of the rotorcraft is mounted and which is usually connected to a gear box independent support structure. The latter is sometimes also referred to as a stand pipe support structure or a lift housing, which is connected to the rotorcraft's airframe, i.e. the rotorcraft's fuselage. Alternatively, the rotating or non-rotating mast can be connected to a mast mounting integrated into the associated gear box, which in turn is connected to the airframe of the rotorcraft. Furthermore, some designs may feature load paths, wherein forces in one or more load directions are solely carried by the gear box independent support structure, while all other forces are routed through the gear box.

It should be noted that in the context of the present invention all arrangements where all bearings that transmit non-torque rotor forces and moments from rotating elements to static elements are mounted above gears of a given gear box of a rotorcraft are considered as having a gear box independent support structure, even if the latter is integrated into a part of a respective gear box housing. A respectively selected design is usually merely dependent on an underlying rotorcraft layout and other applicable factors. Such factors e. g. comprise a selected height above the airframe of the rotorcraft that the gear box and gear box independent support structure impose on the rotor and it is generally considered that any rotor height above a given height that is necessary to accommodate movement and deformation of the rotor in relation to the airframe adds unnecessary aerodynamic drag.

In operation of a rotor of a rotorcraft, large magnitude forces and moments are generated and acting on the rotor that is powered by an associated gear box. It is commonly known that the highest magnitude forces generated by the rotor are those perpendicular to an associated rotor plane, i.e. lift forces. The moments of highest magnitude generated by the rotor are oriented around an axis running on the associated rotor plane. Such large magnitude forces and moments must be transferred to the airframe of the rotorcraft in order to achieve a controlled flight of the rotorcraft while guaranteeing a safe, reliable and durable operation. Furthermore, conversion of rotation speed and torque in the associated gear box also generates loads that must be transferred to the airframe of the rotorcraft. Moreover, inertial loads generated by the associated gear box during landing maneuvers or crash landings of the rotorcraft must also be carried by the airframe.

Frequently, the gear box and the rotor of the rotorcraft are mounted to its airframe by means of a single, i.e. collective mounting arrangement. Furthermore, a variety of anti-vibration functions can be achieved in the form of vibration isolation means that are arranged between the gear box/mounting arrangement and the airframe in order to diminish lifetime reducing vibration loading on rotorcraft equipment and in order to meet ever increasing customer requirements and state regulations concerning safe working environments. In other words, the gear box/rotor is mostly mounted to the airframe by an associated mounting arrangement that is suitable for accommodating anti-vibration means mounted between the gear box/rotor and the airframe.

It should be noted that, as with all elements of a rotorcraft, a lightweight design of such a mounting arrangement is of utmost importance. It is obvious that a favorable selection of geometry and material for all components of the mounting arrangement is therefore of essence. Furthermore, it is generally considered that a compact design is of low weight due to minimization of load carrying distances. Furthermore, a cost efficient solution is generally preferred in order to achieve commercial viability.

More specifically, conventional gear box designs generally use a cast metal or machined metal housing for mounting of the gear box and for transferring rotor loads that are occurring in operation. The metals used are mainly aluminum and magnesium. Such cast metals are, however, of comparatively low strength and have comparatively high defect ratios that must be taken into consideration, and are therefore comparatively heavy compared to machined metals. Machining, on the other hand, places higher restrictions on a possible gear box housing geometry, while allowing slightly higher stress levels. Both methods have a limit on how thin geometries can be manufactured.

Furthermore, structures of gear box housings are usually adapted for separating their interior from the exterior. Therefore, such structures are oversized regarding stress levels as a consequence of an underlying minimum thickness restriction due to cost or manufacturing technology. Use of heavier materials with a higher strength to weight ratio is, therefore, not beneficial as further reduction of the wall thickness of the wall of the gear box housings is not possible and, consequently, a large weight penalty is accumulated in low stress regions. A combination of a lightweight material cast or machined housing with a high strength mounting means is, therefore, preferable. On the other hand any existing structure oversized for stress should be used as far as possible instead of adding additional elements. As composite materials are known for their high strength to weight ratio and as they exhibit comparatively good fatigue characteristics, it is common engineering practice to utilize these materials in rotorcraft design.

Another issue that should be considered in the design of a suitable mounting arrangement is that aside from connecting driving elements of a given rotorcraft with its lift generating rotor, the gear box is also used to drive various other devices and systems of the rotorcraft. The weight and cost conscious integration of these devices and systems is, thus, relevant for design of a suitable mounting arrangement.

It should be noted that the term "mounting arrangement" refers in the context of the present invention to all non-rotating elements that are used to transfer rotor loads and potentially gear box loads to the rotorcraft's airframe. Exemplary mounting arrangements are described hereinafter.

The document EP 0 508 938 A1 describes with respect to FIG. 1B an exemplary mounting arrangement that comprises a stand pipe support structure for a main rotor assembly of a rotorcraft with a plurality of attachment feet. This stand pipe support structure supports a non-rotating rotor mast and a gear box of the main rotor assembly of the rotorcraft, which are integrated with an attachment collar of the stand pipe support structure. In this type of stand pipe support structure, a gear box housing of the main rotor assembly is at least partly defined by a body of the stand pipe support structure, including the attachment feet. The non-rotating rotor mast is integrated with the attachment collar. The stand pipe support structure is secured to an upper deck region of the rotorcraft by means of bolts passing through the attachment feet. Dynamic and static loads of the main rotor assembly are transmitted to a single load transfer level of the rotorcraft's airframe, i.e. the upper deck region, via the attachment feet.

This stand pipe support structure can be manufactured comparatively easily and with low costs of fabrication as an integral unit, and can easily be mounted to an upper deck region of a rotorcraft. Furthermore, due to a relatively uncluttered configuration of this stand pipe support structure, hydraulic lines, subsystem wiring and other interfacing elements that are typically routed over the upper deck region may be readily run over/adjacent to an exterior surface of the stand pipe support structure.

However, this stand pipe support structure is disadvantageous with respect to integration of the gear box within the stand pipe support structure, as the gear box housing acts as a structural member through which dynamic and static loads of the main rotor assembly are intermediately transmitted. Moreover, the weight of the stand pipe support structure is comparatively large because of a required high structural strength of the stand pipe support structure and a usually low strength of the used materials. Furthermore, the direct attachment of the gear box housing to the upper deck region does not provide significant room for provision of a suitable anti-vibration device.

The document EP 0 508 938 A1 also describes with respect to FIG. 1C a further exemplary mounting arrangement that comprises a strut support structure for a main rotor assembly of a rotorcraft. This strut support structure is embodied as a high profile configuration with an integration member and a plurality of struts, such as cylindrical rods or machined legs extending from the integration member and terminating in attachment feet. In this strut support structure, a non-rotating rotor mast of the main rotor assembly is attached to the integration member in a manner that is similar to the one described above with respect to the stand pipe support structure. However, the gear box, i.e. its gear box housing, is attached in suspended combination to an underside of the integration member and, consequently, is not part of a load path for transfer of dynamic and static loads of the main rotor assembly. Instead, the attachment feet are utilized to secure the strut support structure to the rotorcraft's airframe and to transfer dynamic and static loads of the main rotor assembly to respective hard points on the airframe.

The main advantage of such a mounting arrangement concerning load path and material optimization is the possibility of utilizing a high strength to weight ratio material in the strut support structure and the plurality of struts due to not being bound by respective requirements of gear box design. However, a required minimum wall thickness of the gear box housing combined with it not being used for loads transfer results in comparatively low stress levels and, consequently, wasted material and weight. Furthermore, routing of hydraulic lines, electrical subsystem wiring and other interface components along a respective upper deck region of the rotorcraft is complicated because of the strut network that must be accommodated thereon. Finally, an anti-vibration device can easily be integrated into the struts of the strut support structure, but due to a comparatively large number of struts, this would be costly and weight intensive.

The document US 2007/0034736 A1 describes another exemplary mounting arrangement that comprises a strut support structure for a main rotor assembly of a rotorcraft. This strut support structure reduces the underlying number of struts required for load transfer in comparison to the above described strut support structure by utilizing a support arrangement below the gear box for loads running approximately parallel to a rotor plane of the main rotor assembly. More specifically, rotor and gear box of the main rotor assembly are held along the rotor axis by four angled struts that are connected to a lift housing atop the gear box. The lift carrying bearing in this design is situated at the top of the lift housing where the struts are attached. Due to the offset of respective strut attachments to the rotor axis, a part of the moments generated in the main rotor assembly's rotor mast by the rotor are absorbed by the struts as well, but this results in large forces in the struts. However, the strut support structure is not suited for transferring torque loads parallel to the rotor plane, as the struts are situated more or less radial to the rotor axis. Such torque loads and remaining moments are, therefore, countered by the support arrangement below the gear box, which is designed in order to allow vertical freedom of movement, but no rotation around the rotor axis. Movement perpendicular to the rotor axis may be allowed for accommodating an anti-vibration function.

An example of a device that is suitable for allowing such a perpendicular movement is described in the document U.S. Pat. No. 3,920,202. Another option is the use of a membrane.

The mounting arrangement according to document US 2007/0034736 A1 is simple and comprises only a few constituent components with comparatively small complexity. Furthermore, its struts can easily be adapted to end on strong structural elements of the rotorcraft's airframe, such as intersections of longerons and frames. Moreover, an anti-vibration device can easily be mounted below the gear box, if desired. Otherwise, a simple and cheap strut arrangement can be achieved. Alternatively, an anti-vibration device can be fitted into the angled struts as well.

However, due to the effects of the strut geometry, flat struts would result in high strut loads and, therefore, require heavy and large struts. This can be avoided by utilizing a high height and low diameter gear box or by adding an additional support structure above the gear box, which would, nevertheless, lead to a bulky and cumbersome design. Additionally, this height requirement may conflict with a need for a low mounted rotor that is required for optimized aerodynamics.

Still another mounting arrangement is known from the Airbus Helicopters rotorcraft H135. This mounting arrangement comprises a rotating rotor mast and a gear box housing that consists of an upper and a lower housing. Suitable bearings for bearing the rotor mast in a rotatable manner are integrated into the upper and lower housings. The upper housing furthermore comprises, at two opposing sides, attachment structures that are integrally formed with the upper housing for attachment of so-called z-struts, which are adapted for transfer of lift forces. So-called x-struts, which are adapted for transfer of torque and in-plane rotor forces, are connected to bottom parts of the triangular attachment structures and a so-called y-strut, which is adapted for transfer of in-plane rotor forces, is attached to a separate bracket on the lower housing. The gearbox housing comprises dimensions that are chosen such that all required gear box internals can be installed therein. Consequently, these dimensions also define a minimum distance between the two triangular attachment structures, which can be larger than required for the struts or a possible anti-vibration device. At the same time, a possible choice of gear box materials is hindered by the minimum wall thickness issue of the gear box housing.

Advantageously, this mounting arrangement is comparatively flat and utilizes the required minimum wall thickness of the gear box housing to its advantage, as it carries rotor loads. However, if the distance between the two triangular attachment structures is larger than required for the struts, this results in unnecessary long load paths and induces a weight penalty, i.e. an unnecessary large gear box weight.

Still another mounting arrangement is known from the Airbus Helicopters rotorcraft H145. This mounting arrangement also comprises a rotating rotor mast and a gear box housing that consists of an upper and a lower housing, wherein suitable bearings for mounting the rotor mast in a rotatable manner are integrated into the upper and lower housings. However, in contrast to the above described mounting arrangement that is known from the Airbus Helicopters rotorcraft H135, four V-shaped brackets are attached to the upper and lower housings for transferring the lift forces. The V-shaped brackets are attached to the rotorcraft's airframe with struts and connected to the gear box housing by means of screws. This screw connection is, however, not directly adjacent to the bearings for the rotor mast. Furthermore, additional struts are provided at the bottom of the gear box housing for transferring the torque and drag loads.

Advantageously, this mounting arrangement allows parts of the strut support structure to be made of a material other than that used for the gear box housing thereby utilizing optimized material selection. Furthermore, due to the differential nature of the design of the mounting arrangement, an underlying placement of the struts is less constraint by the gear box internals and the gear box housing. However, due to geometrical constraints, the V-shaped brackets are not mounted at a respective source of the loads that are introduced in operation of the rotorcraft into the gear box housing, namely at the upper and lower mast bearings. The gear box housing, therefore, has to carry all loads between the V-shaped brackets and the bearings for the rotor mast for a distance. Furthermore, the attachment of the V-shaped brackets with close set screws lead to a stress concentration in the gear box at corresponding positions of the screw connections.

BRIEF SUMMARY OF THE INVENTION

It is, therefore, an object of the present invention to provide a new mounting arrangement for mounting at least a gear box and/or rotor of a rotorcraft to an airframe of a rotorcraft with improved space and weight efficiency.

This object is solved by a mounting arrangement for mounting at least a gear box of a rotorcraft to a fuselage of a rotorcraft, said mounting arrangement comprising the features of claim 1.

More specifically, according to the present invention, the mounting arrangement comprises a gear box of a rotorcraft and at least two support plates that are rigidly attached to at least approximately opposing sides of the gear box. Each one of the at least two support plates comprises at least two attachment means that are adapted to allow attachment of the at least two support plates to a fuselage of a rotorcraft by means of associated struts in order to enable transfer of induced loads occurring in operation, which are directed into a predetermined load direction, via the associated struts.

It should be noted that in the context of the present invention the terms "fuselage" and "airframe" are interchangeably used for designating a load supporting structure of a rotorcraft, to which the inventive mounting arrangement is rigidly attached. Furthermore, it should be noted that the present invention is only described by way of example with respect to a rotorcraft, but can likewise by applied at least to other aircrafts, where a given component must be connected to a load supporting structure such that induced loads can be transferred from the given component to the load supporting structure.

Advantageously, the inventive mounting arrangement provides an improved strut arrangement compared to conventional designs. Furthermore, a weight amelioration can be achieved due to use of manufacturing characteristics of known gear box designs concerning minimum wall thickness requirements, in order to provide a mounting arrangement with reduced material quantity and, thus, reduced weight. A further weight reduction is possible due to the differential design of the inventive mounting arrangement allowing improved material use.

According to one aspect of the present invention, the support plates are embodied as continuous, complete plates, i.e. plates without any openings or cut-outs through which parts of the gear box could protrude. In this case, the support plates can be used as a gear box support that is merely adapted for connecting the gear box, i.e. an associated gear box housing, to the associated struts, if the associated gear box housing is self-contained. Otherwise, it can further be used to cover or close lateral openings that are provided in the associated gear box housing.

According to another aspect of the present invention, the support plates comprise openings or cut-outs through which parts of the gear box may protrude. In this case, the support plates can be used as a gear box support that is merely adapted for connecting the gear box, i.e. the associated gear box housing to the associated struts, if the associated gear box housing is self-contained and protrudes through the openings or cut-outs. Otherwise, gears of the gear box may protrude through the openings or cut-outs, so that the associated gear box housing and the support plates define an uncomplete containment surface with open regions. In this case, the support plates can be provided with covers for covering these open regions or, alternatively, additional equipment such as an accessory drive gear box can be used to cover the open regions.

Preferably, the support plates are manufactured using composite material. More generally, the support plates preferentially comprise fiber reinforced polymers. For these materials it may be necessary to provide the interface between the gearbox housing and the support plates with a thermal insulation means so as to prevent localized extreme heat, such as heat that develops in a bearing during loss-ofoil scenarios, from damaging the composite material. The need for such insulation means is dependent on the proximity of the carbon to such localized hot spots and the heat dissipating properties of the gearbox housing. Alternatively, the support plates may comprise or be made of a suitable metal, such as e. g. titanium or titanium alloy.

According to one aspect of the present invention, the support plates are not only adapted to enable transfer of induced loads occurring in operation, which are directed into a single predetermined load direction, but also transfer of induced loads occurring in operation, which are directed into another load direction. Preferably, the support plates are at least adapted to enable transfer of lift loads and/or torque and/or drag loads.

According to a preferred embodiment, the at least two support plates are at least approximately arranged in parallel to each other.

According to a further preferred embodiment, the gear box comprises a housing. The housing defines at least partly a containment surface of the gear box and the at least two support plates are rigidly attached to the housing by means of associated attachment members.

According to a further preferred embodiment, the at least two support plates define at least partly the containment surface of the gear box.

According to a further preferred embodiment, the associated attachment members comprise bolts, screws and/or rivets.

According to a further preferred embodiment, at least one of the at least two support plates comprises an opening. The housing protrudes at least partly through the opening.

According to a further preferred embodiment, at least one of the at least two support plates comprises an opening. The gear box is adapted for accommodating a plurality of gears. At least one of the plurality of gears protrudes at least partly through the opening.

According to a further preferred embodiment, at least one closing element is provided for closing the opening.

According to a further preferred embodiment, each one of the at least two support plates comprises at least one additional attachment means that is adapted to allow attachment of the at least two support plates to a fuselage of a rotorcraft by means of an associated strut in order to enable transfer of induced loads occurring in operation, which are directed into a further load direction, via the associated strut. The further load direction differs from the predetermined load direction.

According to a further preferred embodiment, the gear box comprises bearings for mounting a rotor mast of a rotor of a rotorcraft in a rotatable manner. The predetermined load direction is at least oriented either in parallel to a longitudinal extension of the rotor mast or upright on a fuselage of a rotorcraft within a range of variation of approximately 5°.

According to a further preferred embodiment, the further load direction is at least approximately perpendicular to the predetermined load direction.

According to a further preferred embodiment, at least one of the at least two support plates comprises fiber reinforced polymers.

According to a further preferred embodiment, the associated struts are adapted for reducing vibration occurring in operation.

According to a further preferred embodiment, the associated struts are embodied as vibration dampers.

According to a further preferred embodiment, the gear box comprises at least one additional attachment means that is adapted to allow attachment of the gear box to a fuselage of a rotorcraft by means of an associated strut in order to enable transfer of induced loads occurring in operation, which are directed into a further load direction, via the associated strut. The further load direction differs from the predetermined load direction.

The present invention further provides a rotorcraft that comprises a mounting arrangement according to the present invention.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 2 shows a perspective view of the mounting arrangement of FIG. 1, which is embodied according to a first embodiment, FIG. 3 shows a perspective view of the mounting arrangement of FIG. 2 with the rotor mast of FIG. 1.

DETAILED DESCRIPTION OF THE INVENTION

Figure 1:
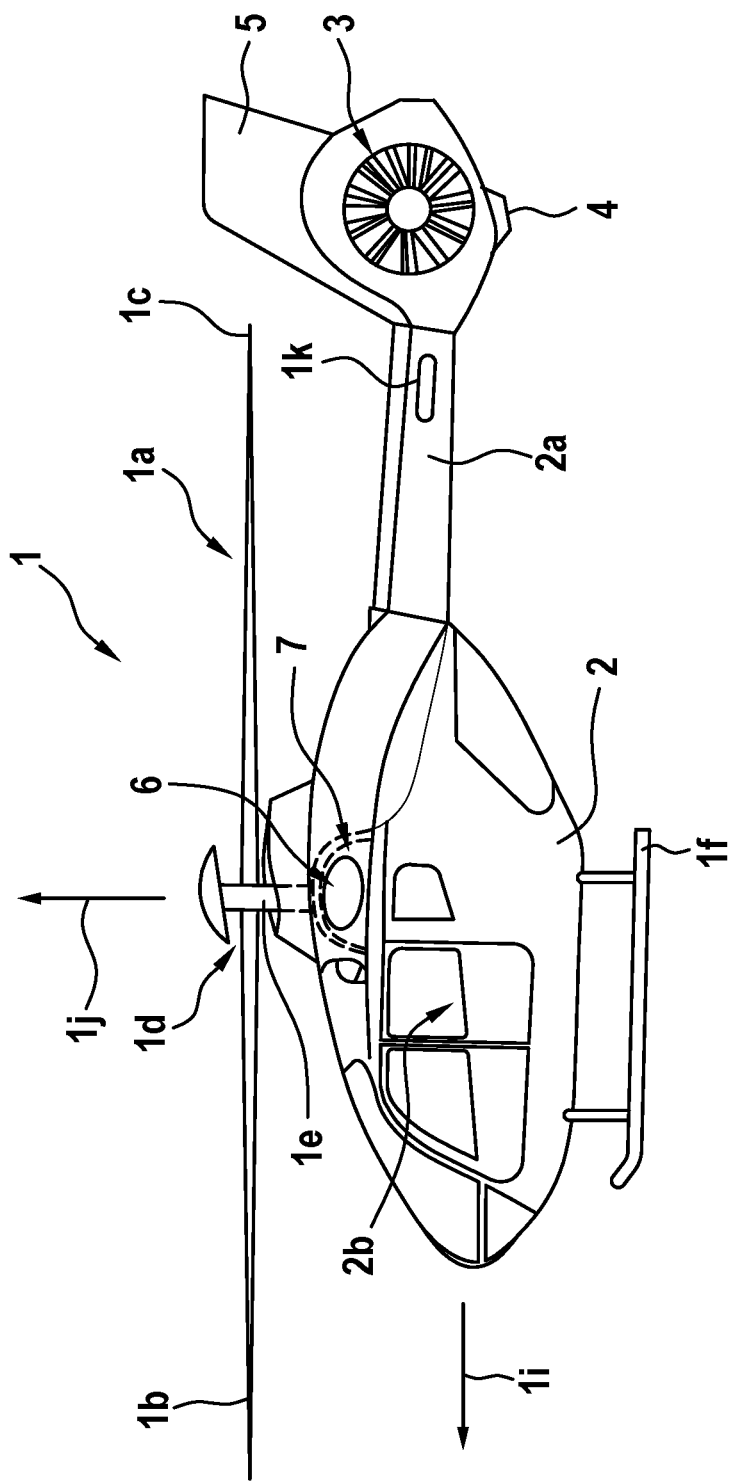
FIG. 1 shows a lateral view of a helicopter with a rotor mast and a rotor and gear box mounting arrangement according to the invention.

FIG. 1 shows an aircraft 1 that is exemplarily illustrated as a rotorcraft and, in particular, as a helicopter. Thus, for purposes of simplicity and clarity, the aircraft 1 is hereinafter referred to as the "helicopter" 1. It should, however, be noted that the present invention is not limited to helicopters and can likewise be applied to other aircrafts, independent of a particular configuration thereof.

Illustratively, the helicopter 1 comprises a fuselage 2 that is connected to a landing gear if and defines a tail boom 2a and a cabin 2b. The helicopter 1 further preferably comprises at least one main rotor 1a, which is illustratively embodied as a multi-blade main rotor, for providing lift and forward, backward or sideward thrust during operation. Therefore, the at least one multi-blade main rotor 1a is powered in operation of the helicopter 1 by means of a main gear box 6 that is driven by associated engines and preferably mounted to the fuselage 2 via an associated mounting arrangement 7. The at least one multi-blade main rotor 1a exemplarily comprises a plurality of rotor blades 1b, 1c that are mounted at an associated rotor head 1d to a rotor mast 1e, which rotates in operation of the helicopter 1 around an associated rotor axis.

According to one aspect of the present invention, the associated mounting arrangement 7 is at least adapted for transferring induced loads occurring in operation of the helicopter 1, which are directed into a first predetermined load direction 1j. Illustratively, this first predetermined load direction 1j corresponds to a height direction of the helicopter 1, in which loads generated by lift forces are induced. More specifically, the first predetermined load direction 1j is preferentially at least oriented either in parallel to a longitudinal extension of the rotor mast 1e or upright on the fuselage 2 of the helicopter 1 within a range of variation of approximately 5°.

Preferably, the associated mounting arrangement 7 is also adapted for transferring induced loads occurring in operation of the helicopter 1, which are directed into a second predetermined load direction 1i. By way of example, this second predetermined load direction 1i differs from the first predetermined load direction 1j and corresponds to a longitudinal direction of the helicopter 1, in which loads generated by drag forces and gearbox torque are induced. Illustratively, the second predetermined load direction 1i is at least approximately perpendicular to the first predetermined load direction 1j.

It should be noted that the at least one multi-blade main rotor 1a is preferably mounted to the helicopter 1 through the main gear box 6. Thus, according to one aspect of the present invention not only the main gear box 6, but also the at least one multi-blade main rotor 1a is mounted to the fuselage 2 by means of the mounting arrangement 7. The latter is, therefore, preferably adapted for transferring not only gear box loads, but also rotor loads to the fuselage 2.

By way of example, the helicopter 1 further comprises at least one preferentially shrouded counter-torque device 3 configured to provide counter-torque during operation, i.e. to counter the torque created by rotation of the at least one multi-blade main rotor 1a for purposes of balancing the helicopter 1 in terms of yaw. The at least one counter-torque device 3 is illustratively provided at an aft section of the tail boom 2a, which preferably further comprises a bumper 4 and a vertical stabilizer 5. Illustratively, the helicopter 1 is further provided with a horizontal stabilizer 1k, which is exemplarily arranged closed to the aft section of the tail boom 2a.

FIG. 2 shows the mounting arrangement 7 of FIG. 1, which is at least adapted for mounting the gear box 6 of the helicopter 1 of FIG. 1 to the fuselage 2 of the helicopter 1. The gear box 6 is preferably equipped with suitable rotor bearings 1g (and 1h in FIG. 3) for bearing the rotor mast 1e of FIG. 1 in a rotatable manner, so that the rotor mast 1e of FIG. 1 is mounted by means of the mounting arrangement 7 via the gear box 6 to the fuselage 2 of the helicopter 1 of FIG. 1. Illustratively, the rotor bearings 1g (and 1h in FIG. 3) are embodied as antifriction bearings, in particular rolling-element bearings.

Preferably, the gear box 6 comprises a housing 6a and a plurality of input/output torque interfaces 6d. The housing 6a preferentially consists of an upper housing 6b and a lower housing 6c. The upper housing 6b is preferably attached to the lower housing 6c by means of suitable attachment members (6f in FIG. 3).

Illustratively, the housing 6a defines at least partly a containment surface 6e, respectively a containment structure 6e, of the gear box 6. This containment surface/structure 6e preferably encompasses a plurality of gear box internal components, such as e.g. a plurality of gears 9.

According to one aspect of the present invention, the mounting arrangement 7 comprises at least the gear box 6 and at least two, and exemplarily exactly two, support plates 8. The latter are preferably rigidly attached to at least approximately opposing sides of the gear box 6 and, preferentially, at least approximately arranged in parallel to each other with a predefined offset 8e. At least one of the two support plates 8 preferably comprises fiber reinforced polymers and/or metal.

The two support plates 8, which are embodied as gear box independent components, are preferably attached to the housing 6a of the gear box 6 by means of associated attachment members 8a and may define at least partly the containment surface/structure 6e of the gear box 6. By way of example, the associated attachment members 8a comprise bolts, screws and/or rivets.

Illustratively, each one of the two support plates 8 comprises a gear box attachment region 8b, where the respective support plate 8 is attached to the housing 6a of the gear box 6. According to one aspect of the present invention, this gear box attachment region 8b comprises an opening 8f, which is exemplarily provided as a cut-out in the support plate 8. Thus, a gear 9 of the gear box 6 that is at least partly accommodated inside the housing 6a may at least partly protrude through the opening 8f.

More specifically, the gear box 6 is preferably adapted for accommodating a plurality of gears 9 and at least one of this plurality of gears 9 protrudes at least partly through the opening 8f. However, it should be noted that constitution and structure of a gear box and its internals are well-known to the person skilled in the art and, as such, not part of the present invention. Therefore, they are not described in greater detail hereinafter.

According to one aspect of the present invention, each one of the two support plates 8 comprises at least two attachment means 8c that are adapted to allow attachment of the respective support plate 8 to the fuselage 2 of the helicopter 1 of FIG. 1 as described below with reference to FIG. 5 up to FIG. 7. Preferably, each one of the two support plates 8 comprises at least one further attachment means 8d that is also adapted to allow attachment of the respective support plate 8 to the fuselage 2 of the helicopter 1 of FIG. 1, as described below with reference to FIG. 5 up to FIG. 7. Illustratively, the attachment means 8c, 8d are embodied as reinforced openings and adapted for transfer of loads that are induced from different load directions, i.e. the load directions 1j, 1i of FIG. 1. The load directions being preferably approximately in plane of the support plate 8.

FIG. 3 shows the mounting arrangement 7 of FIG. 2 with the rotor mast 1e of FIG. 1. FIG. 3 further illustrates bearing of the rotor mast 1e at least in the rotor bearing 1g of FIG. 2, which is illustratively arranged in the upper housing 6b of the gear box 6, and in a rotor bearing 1h, which is illustratively arranged in the lower housing 6c of the gear box 6.

FIG. 3 also further illustrates the rigid attachment of the support plates 8 at the housing 6a of the gear box 6 in the respective gear box attachment regions 8b by means of the attachment members 8a. Illustratively, the latter are embodied as bolts.

Figure 4:
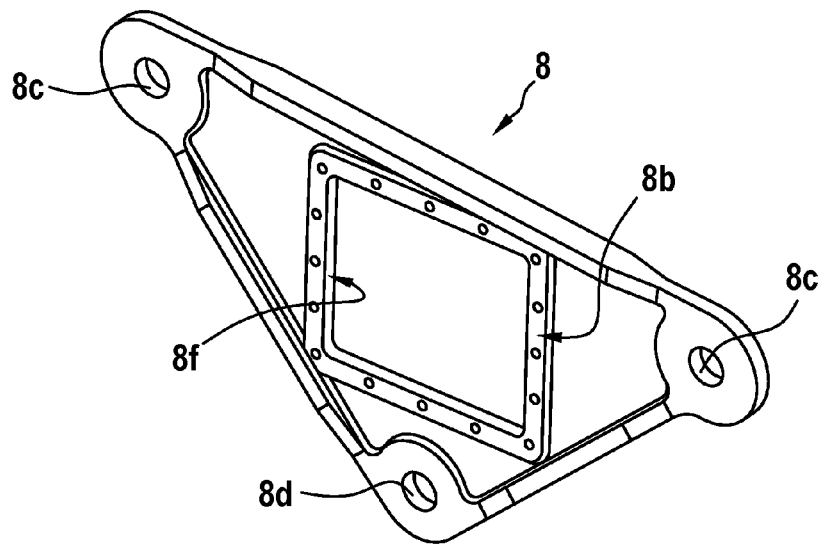
FIG. 4 shows a perspective view of a support plate of the mounting arrangement of FIG. 2 and FIG. 3.

FIG. 4 shows one of the support plates 8 of FIG. 2 and FIG. 3 in greater detail. FIG. 4 further illustrates the gear box attachment region 8b with the opening 8f in the form of a cut-out, as well as the attachment means 8c, 8d.

According to one aspect of the present invention, the support plate 8 is at least approximately triangular. By way of example, the triangular support plate 8 is provided with a longer base side, where the attachment means 8c are arranged, and a tip that is opposed to said longer base side, and where the attachment means 8d is arranged.

Figure 5:
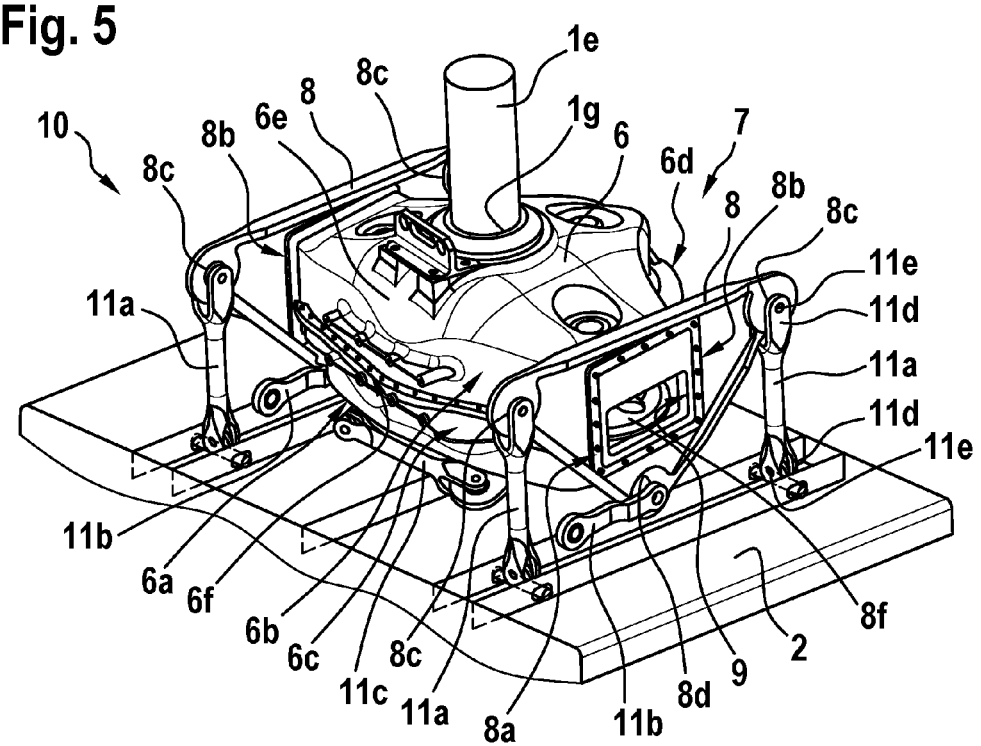
FIG. 5 shows a perspective view of the mounting arrangement of FIG. 3 that is mounted to a fuselage of the helicopter of FIG. 1.

FIG. 5 shows an exemplary assembly 10 with the mounting arrangement 7 of FIG. 2 and FIG. 3, which is mounted to the fuselage 2 of the helicopter 1 of FIG. 1 via associated struts 11a, 11b, 11c. Preferably, at least each one of the associated struts 11a, 11b comprises devises 11d, which are adapted to enable attachment of the associated struts 11a, 11b to the attachment means 8c, 8d of the support plates 8, and to corresponding mounting points provided at the fuselage 2. The attachment is preferentially performed by means of fixation bolts 11e. However, other attachment members are likewise contemplated and within the common knowledge of the person skilled in the art. The associated struts 11c are preferably attached to attachment means that are provided at a lower side of the lower housing 6c of the gear box 6.

According to one aspect of the present invention, the attachment means 8c are adapted to enable transfer of induced loads occurring in operation of the helicopter 1 of FIG. 1, which are directed into the predetermined load direction 1j of FIG. 1, via the associated struts 11a. Likewise, the attachment means 8d are adapted to enable transfer of induced loads occurring in operation of the helicopter 1 of FIG. 1, which are directed into the predetermined load direction 1i of FIG. 1, via the associated struts 11b.

Figure 6:
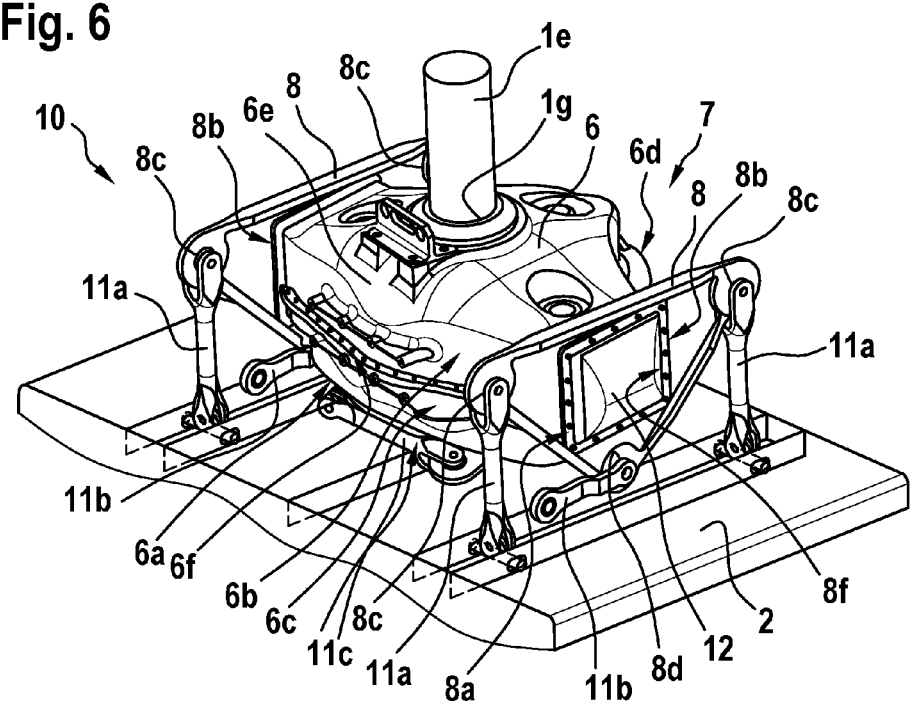
FIG. 6 shows a perspective view of a mounting arrangement that is embodied according to a second embodiment and mounted to a fuselage of the helicopter of FIG. 1.

FIG. 6 shows the assembly 10 of FIG. 5, which is according to one aspect of the present invention equipped with one or more closing elements 12. The latter are preferably adapted for closing the openings 8f provided in the support plates 8 and, by way of example, embodied as covers. Thus, the covers 12 define at least partly the containment surface/structure 6e of the gear box 6.

However, it should be noted that such covers are only described and illustrated by way of example and not for limiting the present invention accordingly. Instead, any element that is suitable for closing the opening 8f is likewise contemplated, such as e. g. an accessory drive gear box and so on.

Figure 7:
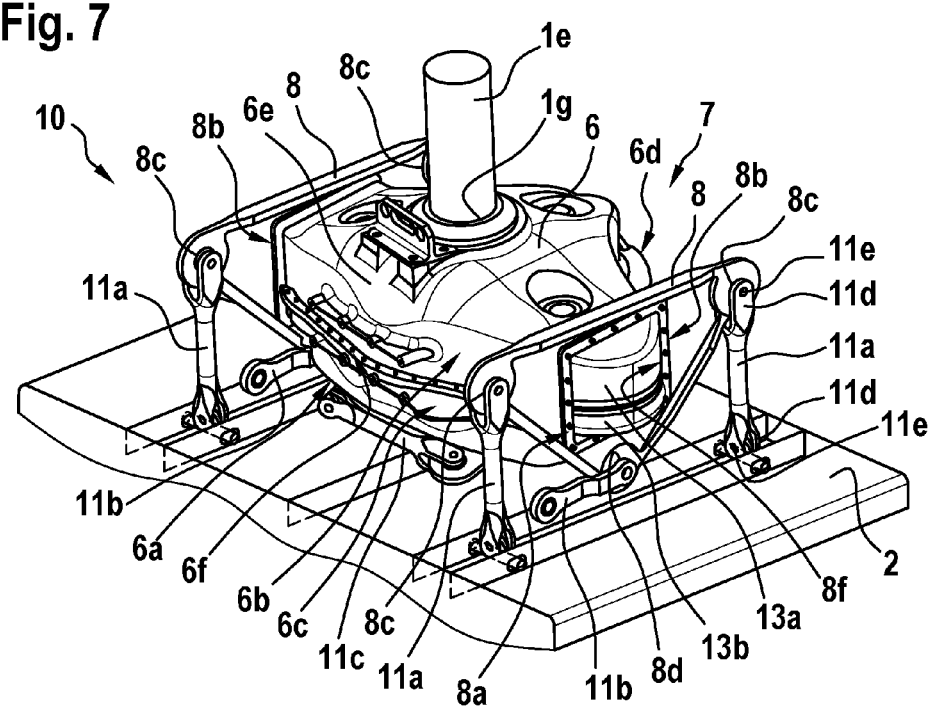
FIG. 7 shows a perspective view of a mounting arrangement that is embodied according to a third embodiment and mounted to a fuselage of the helicopter of FIG. 1.

FIG. 7 shows the assembly 10 of FIG. 5, wherein the upper housing 6b and the lower housing 6c of the housing 6a of the gear box 6 are respectively provided with associated upper housing end sections 13a and lower housing end sections 13b in regions, where the housing 6a is rigidly attached to the support plates 8. In this case, the housing 6a itself is self-contained and protrudes at least partly through the opening 8f provided in the support plates 8 by means of the end sections 13a, 13b, which define at least partly the containment surface/structure 6e of the gear box 6. Consequently, the support plates 8 do not contribute to the definition of the containment surface/structure 6e of the gear box 6 in this case.

Figure 8:
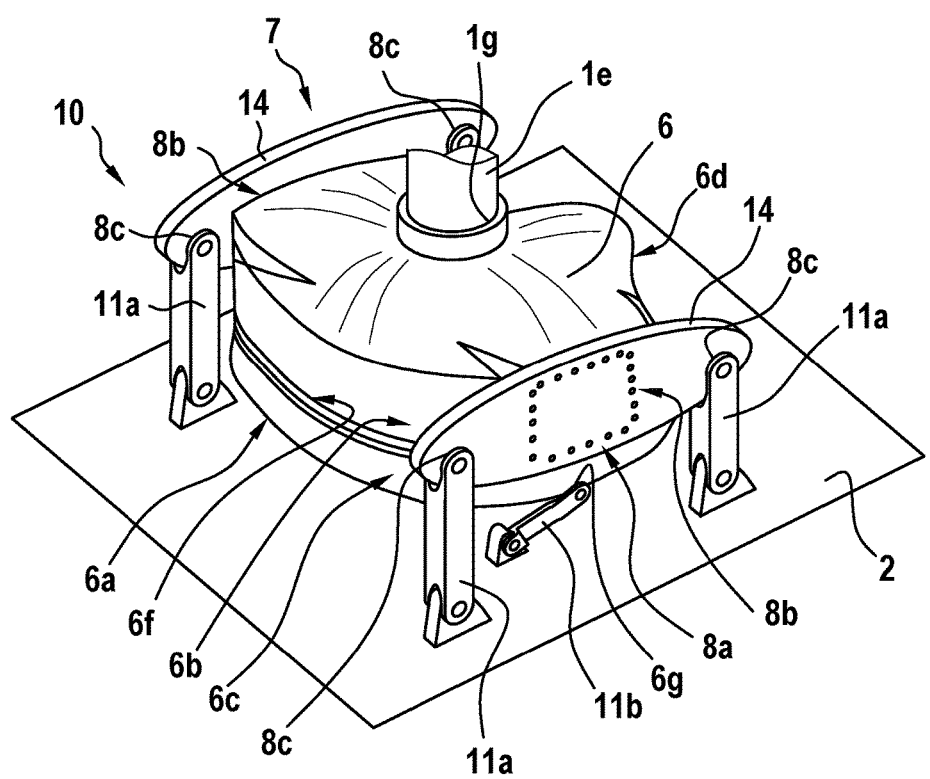
FIG. 8 shows a perspective view of a mounting arrangement that is embodied according to a fourth embodiment and mounted to a fuselage of the helicopter of FIG. 1.

FIG. 8 shows the assembly 10 of FIG. 5, wherein according to one aspect of the present invention the mounting arrangement 7 is equipped with at least one and, illustratively two alternative support plates 14 instead of the support plates 8 of FIG. 2 to FIG. 7. In contrast to the support plates 8, the alternative support plates 14 are not provided with the opening, i.e. cut-out 8f of FIG. 2 to FIG. 7 in their gear box attachment region 8b. Instead, they are embodied as continuous, complete plates. A cut-out may nevertheless be advantageous in certain applications and may be implemented as shown in FIG. 2 up to FIG. 7 with the embodiments using the support plates 8. Furthermore, in contrast to the support plates 8, the alternative support plates 14 are only provided with the attachment means 8c, while the attachment means 8d are replaced by means of attachment means 6g, which are provided at the lower housing 6c of the housing 6a of the gear box 6.

Similar to the support plates 8, the alternative support plates 14 are adapted for mounting the gear box 6 of the helicopter 1 of FIG. 1 to the fuselage 2 of the helicopter 1. However, in the case described above with reference to FIG. 2, where the housing 6a of the gear box 6 is open at its sides, the alternative support plates 14 close the gear box 6 and, thus, define part of its containment surface/structure 6e.

It should be noted that modifications to the above described embodiments are within the common knowledge of the person skilled in the art and, thus, also considered as being part of the present invention. For instance, the associated struts 11a, 11b, 11c of FIG. 5 to FIG. 8 can be adapted for reducing vibration occurring in operation of the helicopter 1 of FIG. 1. According to one aspect of the present invention, they can also be embodied as vibration dampers. Exemplary anti-vibration devices are described in the document U.S. Pat. No. 6,293,532 B2.

Furthermore, the above described aspects of the present invention can similarly be applied, i.e. combined to define variants of the present invention. For instance, the gear box 6 of FIG. 1 can be open on one side, as described above with reference to FIG. 2 and FIG. 3, and closed on the other side, as described above with reference to FIG. 7, or a cover can be provided on one side, as described above with reference to FIG. 6. Alternatively, one side of the mounting arrangement 7 of FIG. 1 can be embodied by the support plate 8 of FIG. 2 to FIG. 7, and the other side with the alternative support plate 14 of FIG. 8, and so on.

REFERENCE LIST 1 aircraft
1a multi-blade main rotor
1b, 1c rotor blades
1d rotor head
1e rotor mast
1f landing gear
1g, 1h rotor bearings
1i longitudinal direction
1j height direction
1k horizontal stabilizer
2 fuselage
2a tail boom
2b cabin
3 counter-torque device
4 bumper
5 vertical stabilizer
6 main gear box
6a main gear box housing
6b upper housing
6c lower housing
6d input/output torque interfaces
6e containment surface/structure
6f upper/lower housing attachment members
6g lower housing second direction force transmitting attachment means
7 rotor and gear box mounting arrangement
8 support plates
8a support plate attachment members
8b main gear box attachment region
8c first direction force transmitting attachment means
8d second direction force transmitting attachment means
8e plate offset
8f plate opening
9 gears
10 fuselage with rotor and gear box mounting assembly
11a first direction force transmitting strut 11b second direction force transmitting strut
11c third direction force transmitting strut
11d devises
11e fixation bolts
12 plate opening closing element
13a upper housing end section
13b lower housing end section
14 alternative support plates

What is claimed is:

1. A mounting arrangement for mounting at least a gear box of a rotorcraft to a fuselage of a rotorcraft, the mounting arrangement comprising a gear box of a rotorcraft and at least two support plates that are rigidly attached to substantially opposing sides of the gear box, each one of the at least two support plates comprising at least two attachment means configured to attach the at least two support plates to a fuselage of a rotorcraft by means of associated struts in order to enable transfer of induced loads occurring in operation, which are directed into a predetermined load direction, via the associated struts; wherein the gear box comprises a housing, the housing defining at least partly a containment surface of the gearbox and the at least two support plates being rigidly attached to the housing by means of associated attachment members, and wherein the at least two support plates define at least partly the containment surface of the gear box.

2. The mounting arrangement according to claim 1, wherein the at least two support plates are substantially arranged in parallel to each other.

3. The mounting arrangement according to claim 1, wherein the associated attachment members comprise bolts, screws and/or rivets.

4. The mounting arrangement according to claim 1, wherein at least one of the at least two support plates comprises an opening, the housing protruding at least partly through the opening.

5. The mounting arrangement according to claim 1, wherein each one of the at least two support plates comprises at least one additional attachment means that is adapted to allow attachment of the at least two support plates to a fuselage of a rotorcraft by means of an associated strut in order to enable transfer of induced loads occurring in operation, which are directed into a further load direction, via the associated strut, the further load direction differing from the predetermined load direction.

6. The mounting arrangement according to claim 1, wherein at least one of the at least two support plates comprises fiber reinforced polymers.

7. The mounting arrangement according to claim 1, wherein the associated struts are adapted for reducing vibration occurring in operation.

8. The mounting arrangement according to claim 1, wherein the associated struts are embodied as vibration dampers.

9. The mounting arrangement according to claim 1, wherein the gear box comprises at least one additional attachment means that is adapted to allow attachment of the gear box to a fuselage of a rotorcraft by means of an associated strut in order to enable transfer of induced loads occurring in operation, which are directed into a further load direction, via the associated strut, the further load direction differing from the predetermined load direction.

10. The mounting arrangement according to claim 1, wherein at least one of the at least two support plates comprises an opening such that the gear box housing and the two support plates define an uncomplete containment surface with the opening, the gear box being adapted for accommodating a plurality of gears, at least one of the plurality of gears protruding at least partly through the opening to be outside of the containment surface.

11. The mounting arrangement according to claim 10, wherein at least one closing element is provided for closing the opening.

12. The mounting arrangement according to claim 1, wherein the gear box comprises bearings for mounting a rotor mast of a rotor of a rotorcraft in a rotatable manner, wherein the predetermined load direction is at least oriented either in parallel to a longitudinal extension of the rotor mast or upright on a fuselage of a rotorcraft within a range of variation of 0° to 10°.

13. The mounting arrangement according to claim 12, wherein a further load direction is substantially perpendicular to the predetermined load direction.

14. A rotorcraft comprising a mounting arrangement according to claim 1.

15. A mounting arrangement for mounting a gear box of a rotorcraft to a fuselage of a rotorcraft, the mounting arrangement comprising:
    a housing having first and second opposing sides, the housing defining a portion of a containment surface;
    first and second support plates rigidly attached to the first and second opposing sides of the housing, wherein the housing and the first and second support plates cooperate to define a containment surface for a plurality of gears of a gear box of the rotorcraft, wherein each of the first and second support plates defines a pair of reinforced openings therethrough;
    a first pair of struts, each of the first pair of struts connecting a respective one of the pair of reinforced openings of the first support plate to the fuselage of the rotorcraft to transfer and direct induced loads occurring in operation into a predetermined load direction via the associated struts; and
    a second pair of struts, each of the second pair of struts connecting a respective one of the pair of reinforced openings of the second support plate to the fuselage of the rotorcraft to transfer and direct induced loads occurring in operation into a predetermined load direction via the associated struts.

16. The mounting arrangement according to claim 15, further comprising the plurality of gears;
    wherein the first support plate defines an opening therethrough such that the containment surface is uncomplete, and such that at least one of the plurality of gears protrudes at least partly through the opening to be accessible from outside of the mounting arrangement.

17. The mounting arrangement according to claim 15, wherein the housing includes an upper housing and a lower housing, the upper housing attached to the lower housing.

18. The mounting arrangement according to claim 15, wherein each of the first and second support plates defines another reinforced opening therethrough; and
    wherein the mounting arrangement further comprises a third strut connecting the another reinforced opening of the first support plate to the fuselage of the rotorcraft to transfer and direct induced loads occurring in operation into another predetermined load direction via the third strut, the another predetermined load direction differing from the predetermined load direction; and
    a fourth strut connecting the another reinforced opening of the second support plate to the fuselage of the rotorcraft to transfer and direct induced loads occurring in operation into the another predetermined load direction via the fourth strut.

19. The mounting arrangement according to claim 18, wherein each of the first and second support plates is substantially triangular and defines a base side and a tip opposite to the base side, wherein the pair of reinforced openings is arranged along the base side, and wherein the another reinforced opening is arranged at the tip.

20. The mounting arrangement according to claim 18, further comprising a fifth strut connecting the housing to the fuselage of the rotorcraft to transfer and direct induced loads occurring in operation into a further predetermined load direction via the fifth strut, the further predetermined load direction differing from the predetermined load direction and the another predetermined load direction.

\* \* \* \* \*